No. 651,489. Patented June 12, 1900.
W. G. MacLAUGHLIN.
FLUID PRESSURE BRAKE.
(Application filed Sept. 15, 1899.)
(No Model.) 3 Sheets—Sheet 1.
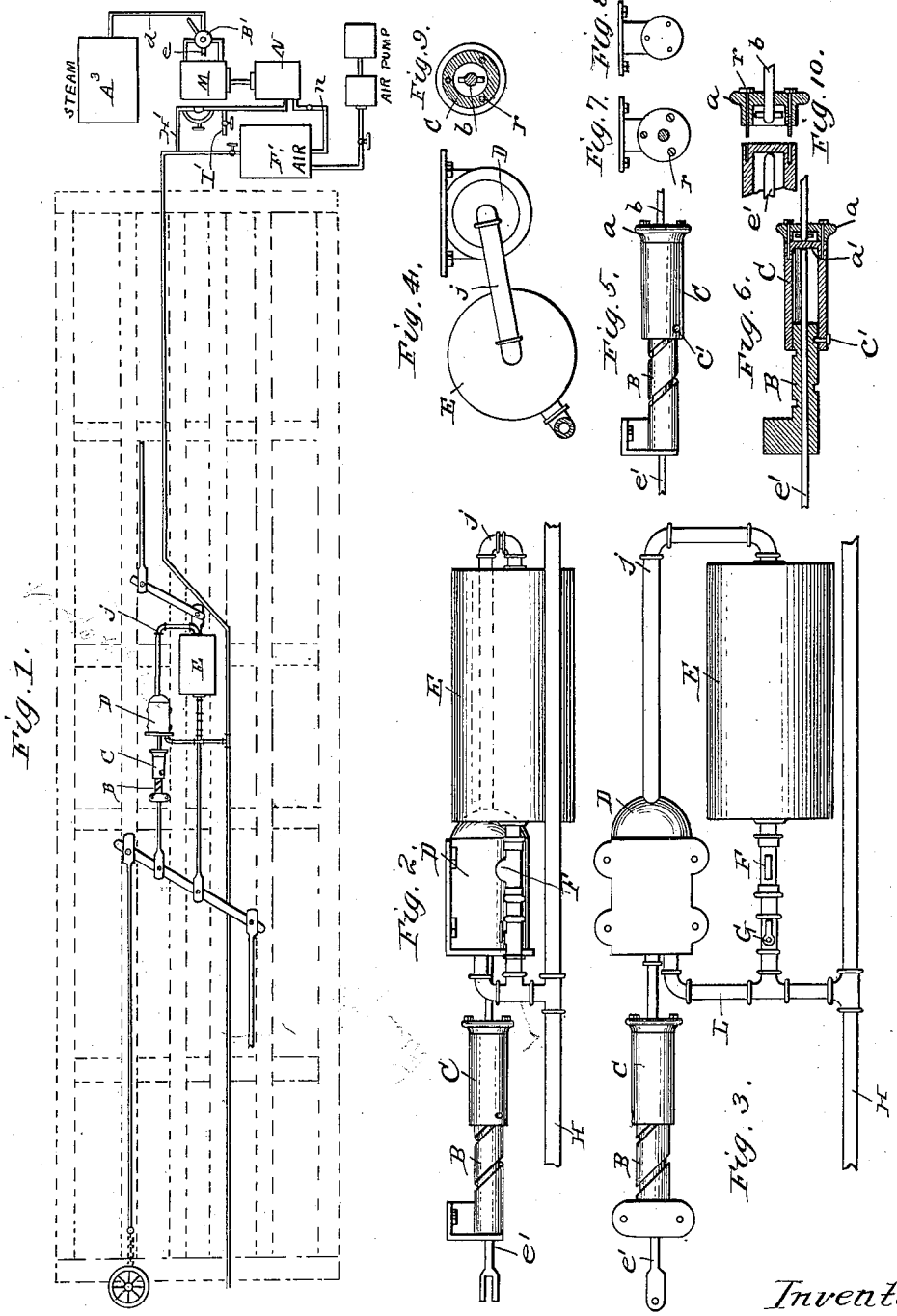

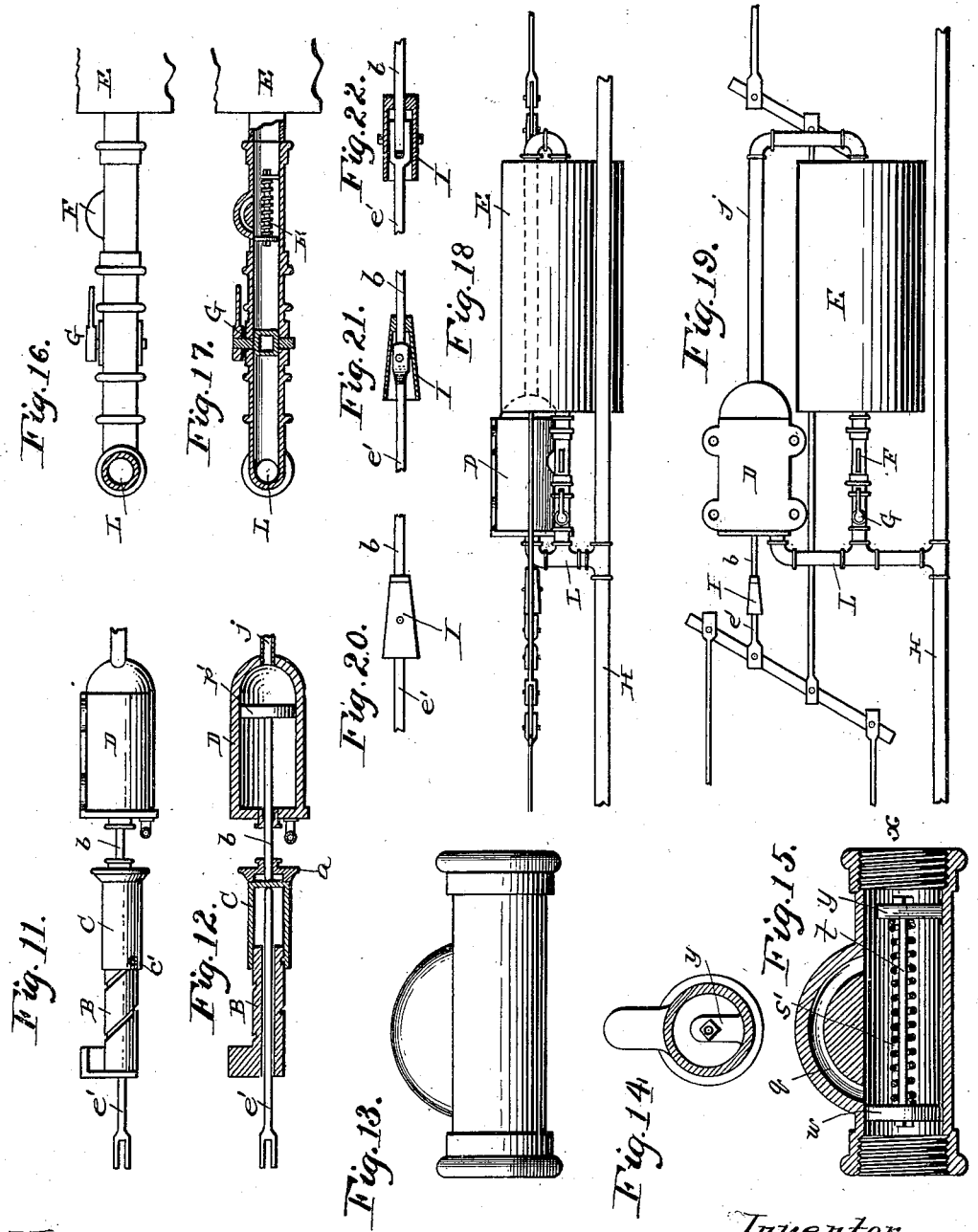

No. 651,489. Patented June 12, 1900.
W. G. MacLAUGHLIN.
FLUID PRESSURE BRAKE.
(Application filed Sept. 15, 1899.)

(No Model.) 3 Sheets—Sheet 3.

Witnesses
Inventor
William G. MacLaughlin
By Daniel Davis
Attorneys.

United States Patent Office.

WILLIAM G. MacLAUGHLIN, OF INDEPENDENCE, MISSOURI, ASSIGNOR TO THE MacLAUGHLIN AUTOMATIC AIR BRAKE COMPANY, OF CHARLESTON, WEST VIRGINIA.

FLUID-PRESSURE BRAKE.

SPECIFICATION forming part of Letters Patent No. 651,489, dated June 12, 1900.

Application filed September 15, 1899. Serial No. 730,577. (No model.)

*To all whom it may concern:*

Be it known that I, WILLIAM G. MACLAUGHLIN, a citizen of the United States, and a resident of Independence, county of Jackson, State of Missouri, have invented certain new and useful Improvements in Automatic Air-Brakes, of which the following is a specification, reference being had therein to the accompanying drawings, in which—

Figure 23:
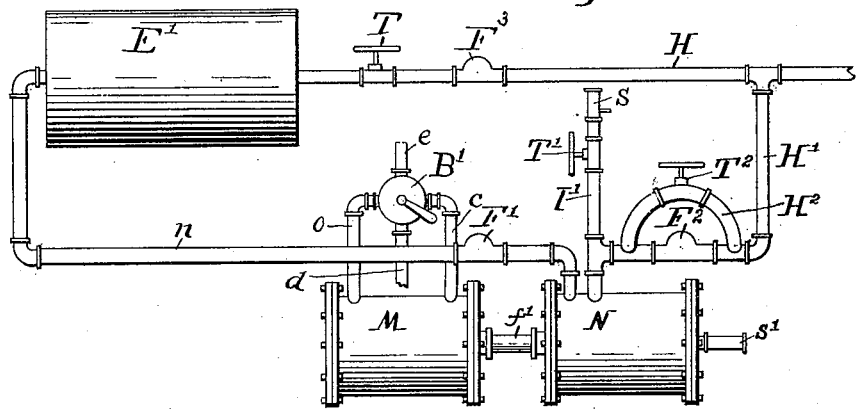
Figure 24:
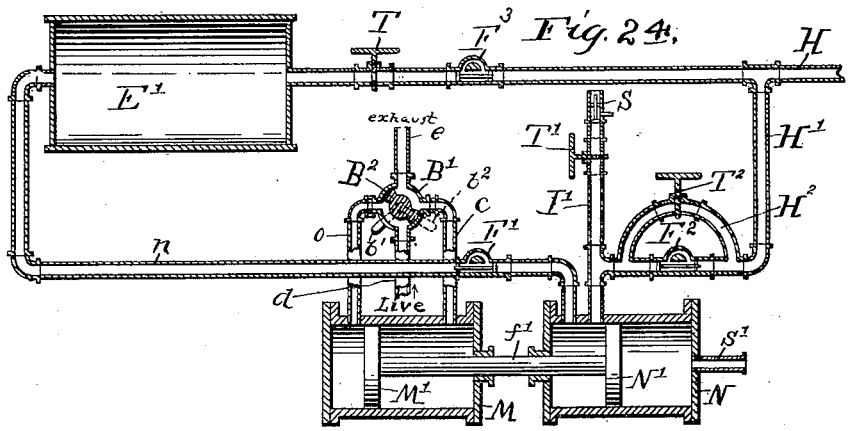
Figure 25:
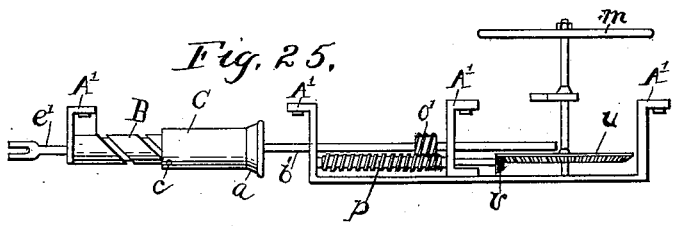

Figure 1 is a bottom plan view showing the relative positions of the various parts of the brake upon the bottom of a car. Figs. 2, 3, and 4 are respectively detail side, top, and end views of the brake-applying mechanisms. Figs. 5 and 7 are respectively detail side and end views of the cam and the rotatable sleeve which operates the brake push-rod. Fig. 6 is a detail sectional view of same. Fig. 8 is an end view of same with end cap removed. Figs. 9 and 10 are detail sectional views of the end cap of the rotatable sleeve. Figs. 11 and 12 are respectively detail side and longitudinal sectional views of the brake-cylinder, cam, and rotating sleeve, showing their relative positions to one another and the manner of connecting them. Figs. 13, 14, and 15 are respectively side, end, and detail sectional views of the byway, (designated F.) Figs. 16 and 17 are respectively detail and sectional and side views of the pipe $i$, showing the manner of connecting the byway F and the cut-off G to the mechanism. Figs. 18 and 19 are respectively side and top views of the direct-application brake, which is the same as the brake shown in Figs. 2 and 3, with the exception of the cam and the rotating sleeve, which are left off. Figs. 20, 21, and 22 are respectively various views of the knuckle-joint and shield of the direct-application brake. This knuckle-joint and shield takes the place of the cam and rotating sleeve in the brake, as shown in Figs. 2 and 3. Figs. 23 and 24 are respectively detail elevation and sectional views of the means for actuating the brake-applying mechanism; and Fig. 25 is a side view of the hand-power brake, showing the improved hanger A′ and the extension of the push-rod $b'$ to hold the worm-pinion $o'$ to its place.

This invention relates to fluid-pressure brakes for railway-cars; and it has for its main objects to provide an apparatus by means of which the brakes of all the cars may be positively and simultaneously applied and released by the engineer in his cab, the actuating fluid being forced through the apparatus by a suitable power, said actuating fluid operating to apply or release the brakes without being exhausted from the apparatus, and to provide a positively-actuated fluid-pressure brake which will automatically set if the cars become disconnected from each other or from the engine by accident. Other objects will hereinafter appear.

Referring to the various parts by letters, E′, Figs. 23 and 24, designates the main air-reservoir, which may be located upon the engine or tender at any suitable point.

B′ is a valve-casing containing a rotary valve $B^2$, which shall be hereinafter designated as the "engineer's" valve. This valve should be situated in the cab within convenient reach of the engineer. Connecting the steam boiler or reservoir $A^3$ with the valve-casing is a pipe $d$. Connected also to said valve-casing is a steam-exhaust pipe $e$. Connected to the same valve-casing, at right angles to the said pipes $d$ and $e$, are pipes $o$ and $c$, connected, respectively, to the opposite ends of the steam-cylinder M. Connected to the main air-reservoir is the train-pipe H. Branching from the train-pipe and connected to the left end of the air-cylinder N is a pipe H′, containing a byway $F^2$, which works toward the right, as shown in the drawings. Connected at both of its extremities to the pipe H′ and extending around the byway $F^2$ is a pipe $H^2$, which contains a globe-valve $T^2$. Also branching from the pipe H′ is a pipe I′, containing a pop-valve S, set at sixty pounds pressure. Pipe I′ also contains a globe-valve T′. Pipe $n$ connects the main air-reservoir E′ to the left end of the air-cylinder N and contains the byway F′, operating toward the left. The train-pipe H before the pipe H′ branches from it contains a globe-valve T and a byway $F^3$ in the relative positions shown in the drawings and continuing is connected to the various cars in the train by hose connections in the usual manner. Working between and extending at its ends into the cylinders M and N is a piston-rod $f'$, upon which are mounted, one on each end of the piston-rod and inside their respective cylinders, two piston-heads M' and N', as shown in the drawings.

S', on the right end of the air-cylinder N, is any contrivance to allow air to freely pass in or out as the piston moves in either direction in the said cylinder.

Supported from the bottom of the car and extending lengthwise thereof are a brake-cylinder D and an auxiliary air-reservoir E, Fig. 1. Connecting the front end of the brake-cylinder with the train-pipe is pipe L, which is also connected to the auxiliary air-reservoir and contains a cut-off valve G and a byway F, which operate to permit air to pass into the reservoir. Connecting the auxiliary air-reservoir with the rear end of the brake-cylinder is a pipe $j$. Having reference to Fig. 12, it can be seen that within the brake-cylinder there is a piston-head $p'$, mounted upon a piston-rod $b$. The outer end of the piston-rod is loosely connected to the rotatable sleeve C by means of a hollow cap $a$, said cap being firmly and rigidly fastened to the rotatable sleeve by the cap-screws $r$. The rotatable sleeve has a solid head $a'$, against which the outer end of the piston-rod $b$ pushes, and said sleeve fits over the support B and is caused to revolve around it by the lug-screw $c'$ on the sleeve fitting in and following the spiral slot or groove $d$ on the support when the sleeve is forced over the support. Passing loosely through the support B and extending inward into the rotating sleeve, its inner end bearing against the solid head $a'$, is the push-rod $e'$, whose outer end is fastened to the brake-rod of any convenient system of brake-levers.

When air from the auxiliary reservoir is permitted to expand into the brake-cylinder, the piston therein is forced forward, and as the piston-rod connected to the forward side of said piston is attached to the sleeve C it forces said sleeve forward on its cylindrical support. As the rear or inner end of the push-rod $e'$ of the brake mechanism bears against the solid rear head $a'$ of the sleeve C said push-rod will be forced forward by the forward movement of the piston-rod, and said forward movement of the push-rod will operate the brake mechanism. As the sleeve C is forced forward over its support it will be caused to revolve about said support by means of the pin or lug $c'$ engaging the groove $d$ of said support, the object of this pin-and-groove arrangement being to steady the movement of the sleeve and prevent a too-sudden application of the brakes. Any well-known type of brake mechanism wherein the brake-shoes are automatically released from the car-wheels, either by suitably-disposed springs or by gravity, when the pressure which applies them is released may be employed.

The byway F is a mechanism the purpose of which is to allow a fluid to pass through it to the reservoir E and to prevent the said fluid from flowing from the reservoir through pipe L. This object is accomplished by means of a semicircular passage $q$, (reference being had to Fig. 15,) a permanent guide $y$, a piston-rod $t$, a piston-head $w$, and a spiral spring $s'$, combined relatively as shown in the drawings. It can readily be seen that the fluid cannot flow through the byway from the end designated $x$, because by the peculiar arrangement of the various parts of the mechanism the passage cannot be forced open from that end. The operation of this part of the mechanism is as follows: Into the main air-reservoir and the train-pipe and its connections air should first be pumped and compressed to the required or customary pressure (which is usually eighty pounds) by an air-pump or any other convenient means for compressing air. When the mechanism has the position as shown in Fig. 24, the air under compression flows along the train-pipe H, filling the various auxiliary air-reservoirs and brake-cylinders on the train. It also flows along the pipe H' from the train-pipe until it meets the closed globe-valve $T^2$ and the byway $F^2$, when it must cease flowing. In this normal position of the apparatus the piston in the brake-cylinder is near the right-hand end of the said cylinder and the brakes are in their released position. To apply the brakes, close the globe-valve T and then open the globe-valve $T^2$ and place engineer's valve in the position shown in Fig. 24. By first closing the globe-valve T the flow of air from the main air-reservoir is prevented. By admitting steam to the left end of cylinder M the piston N' in cylinder N is forced toward the right, creating a partial vacuum in the left end of said cylinder. Then by opening the globe-valve $T^2$ the air in the train-pipe is allowed to expand into the air-reservoir N, thus decreasing the pressure of the air in the train-pipe and also in the front end of the brake-cylinder. By thus creating a partial vacuum in the cylinder N the movement of the air from the train-pipe into said cylinder will be more rapid, and a more rapid operation of the apparatus to apply the brakes will be secured than would be possible if the air were permitted to simply expand into an ordinary exhaust-receiving tank. The air in the auxiliary air-reservoir is prevented from flowing back into the train-pipe by the piston W in the byway F, (shown in Figs. 2 and 3,) and it hence expands into the rear end of the brake-cylinder and, forcing the piston forward, applies the brakes. To release the brakes, close the globe-valve $T^2$ and open the globe-valve T, turn the engineer's-valve handle $b'$ to the position designated $b^2$ in the drawings, (this will connect pipe $c$ with the steam-pipe $d$ and the pipe $o$ with the exhaust-pipe $e$,) and the piston will be driven toward the left, compressing the air in the left end of the air-cylinder N into the air-reservoir and also by the byway $F^2$ into the train-pipe. From this pipe the air enters the left end of the brake-cylinder and returns the piston therein to its normal position, thereby releasing the brakes. As the air-passage into the left end of the brake-cylinder is unobstructed, the air from the train-pipe will pass freely and quickly into the brake-cylinder and immediately return the piston therein to its normal position, thereby forcing the air back from the brake-cylinder into the auxiliary reservoir and restoring the normal pressure therein. Air from the train-pipe will pass through the byway F to replace air which may escape from said reservoir by leakage, and thereby maintain the normal pressure therein.

For an emergency stop the globe-valve T and the pop-valve S are provided. Open the valve T' and the valve T² and close valve T. The air in the train-pipe will then expand, pressing against the pop-valve S, and thus escape into the atmosphere, reducing the pressure of the air in the front end of the brake-cylinder to such an extent that the brakes will be firmly applied. Releasing the brakes after having been applied in the above manner is the same as in the usual manner, except that the valve T' must first be closed. After using the emergency-stop the pressure that was lost by permitting the air in the train-pipes to escape into the atmosphere will have to be restored by action of the air-pump connected to the main reservoir. If this is not done, the pressure of the air in the train-pipes will not be sufficiently strong to overcome the pressure of the confined air in the auxiliary air-reservoir against the piston-head in the rear end on the brake-cylinder.

The direct-application brakes shown in Figs. 18 and 19 are the same as the brakes shown in Figs. 2 and 3, with the exception that the cam and rotating sleeve are supplanted by the knuckle-joint and shield, (designated I in the drawings.) The shield has flanges on each side of it to prevent the push-rod e' from being twisted or thrown out of line by the vibration or swing of the brake-beam to which it is fastened.

On the hand-power brake, Fig. 25, are the cam and rotating sleeve, as in the other brakes. m is a brake-lever wheel which when turned rotates the bevel-wheel u, which meshes with and rotates the bevel-wheel v, whose shaft carries the worm p. Engaging worm p is the worm-pinion o', which is caused to travel forward or backward, according to the direction in which the brake-wheel m is being turned. As the worm-pinion o' moves forward along the worm p, it being connected to the push-rod e' forces the rotating sleeve along the cam and applies the brake in the usual manner. When the brake-wheel is turned in the opposite direction, the worm o' is caused to travel backward along the worm p and releases the brake, the same as a backward movement of the piston in the other brakes causes the brakes to be released.

Should the train-pipe become broken at any point or be accidentally disconnected at the hose-pipe connections between the cars, the brakes will be automatically applied. It will therefore be readily seen that if any cars of the train should become accidentally detached from the train the brakes would be automatically set on both sections of the train.

Having thus fully described my invention, what I claim, and desire to secure by Letters Patent, is—

1. In a fluid-pressure brake, the combination of a brake-cylinder, a piston therein, a brake mechanism connected to said piston, a fluid-reservoir, a fluid-pressure mechanism connecting said reservoir to the brake-cylinder and normally maintaining a fluid under a pressure on both sides of the piston in said brake-cylinder and holding the brakes in their released position, means for creating a partial vacuum in the fluid-reservoir, means for permitting the fluid from one end of the brake-cylinder to expand into said reservoir, whereby the fluid in the other end of said cylinder will move the piston therein, means for forcing said fluid back into the said end of the brake-cylinder thereby returning the piston to its normal position.

2. In a fluid-pressure brake, the combination of a brake-cylinder, a brake-operating piston therein, a brake mechanism connected to said piston, an air-reservoir, a fluid-pressure mechanism connecting said air-reservoir to the brake-cylinder and normally maintaining a fluid under pressure on both sides of the brake-piston and holding the brakes in their released position, reciprocating means connected to the air-reservoir, which means by its reciprocation will cause air to flow from the fluid-pressure mechanism into said reservoir or to flow from said reservoir into the mechanism, and valves in the fluid-pressure mechanism to permit air to flow from only one end of the brake-cylinder into the air-reservoir.

3. In a fluid-pressure brake, the combination of a brake-cylinder, a brake-operating piston therein, a brake mechanism connected to said piston, a fluid-pressure mechanism connected to the brake-cylinder and adapted to normally maintain a fluid under a pressure on both sides of the brake-operating piston and hold the brakes in their released position, an air-reservoir connected to said fluid-pressure mechanism, a piston therein which by its movement in one direction reduces the pressure on one side of the brake-applying piston and permits the fluid on the other side of the said piston to expand and move the said brake-applying piston, and by its movement in the other direction restores the normal pressure in the brake-cylinder and returns the brake-applying piston to its normal position, and means for reciprocating the piston in the air-reservoir whereby the brakes may be operated without releasing any of the fluid from the apparatus.

4. In a fluid-pressure brake, the combination of a brake-cylinder, a brake-operating piston therein, a brake mechanism connected to said piston, a fluid-pressure mechanism connected to the brake-cylinder and adapted to normally maintain a fluid under a pressure on both sides of the brake-operating piston and hold the brakes in their released position, an air-reservoir connected to said fluid-pressure mechanism, a piston therein which by its movement in one direction reduces the pressure on one side of the brake-applying piston and permits the fluid on the other side of the said piston to expand and move the said brake-applying piston, and by its movement in the other direction restores the normal pressure in the brake-cylinder and returns the brake-applying piston to its normal position, and a steam-actuated device for reciprocating the piston in the air-reservoir.

5. The combination of a brake-cylinder, a brake mechanism operated from said cylinder, a main fluid-pressure tank, an auxiliary pressure-tank, a valved train-pipe connecting the main tank to one end of the brake-cylinder and to the auxiliary tank, a pipe connecting the auxiliary tank to the other end of the brake-cylinder, a valve adjacent the auxiliary tank for permitting fluid to pass from the train-pipe to the auxiliary tank and to prevent it passing back to the train-pipe from the auxiliary tank, means connected to the main pipe for reducing the pressure therein and in the connected end of the brake-cylinder, whereby the fluid in the auxiliary tank will be permitted to expand into the other end of the brake-cylinder, said means consisting of an air-cylinder, a piston therein, and means for reciprocating said piston.

6. In a fluid-pressure brake, the combination of a brake-cylinder, a brake-operating piston therein, an auxiliary air-reservoir connected to one end of said brake-cylinder, a main reservoir, pipe H connecting the main reservoir to the other end of the brake-cylinder, pipe L connecting pipe H to the auxiliary reservoir, valve F in said pipe L, air-cylinder N, a piston therein, a pipe H' connecting pipe H to said cylinder, valve F² in said pipe H', pipe H² extending around valve F² and connected at its ends to pipe H', valve T² in pipe H², pipe n connecting air-cylinder N to the main reservoir, valve F' in said pipe T², valve F³ in pipe H, and means for reciprocating the piston in the air-cylinder N.

7. In a fluid-pressure brake, the combination of a brake-cylinder, a brake-operating piston therein, an auxiliary air-reservoir connected to one end of said brake-cylinder, a main reservoir, pipe H connecting main reservoir to the other end of the brake-cylinder, pipe L connecting pipe H to the auxiliary reservoir, valve F in said pipe L, air-cylinder N, piston therein, pipe H' connecting pipe H to said cylinder, valve F² in said pipe H', pipe H² extending around valve F² and connected at its ends to pipe H', and means for reciprocating the piston in cylinder N.

8. In a brake, the combination of a rotatable sleeve, a cylindrical support therefor, said support being formed with a spiral groove, a lug on the sleeve entering the groove, a brake-operating rod for forcing the sleeve over its support, a hollow cap on the end of said sleeve, means for rotatively connecting the brake-operating rod to said cap, and means for reciprocating the brake-operating rod.

9. In a brake, the combination of a rotatable sleeve formed with solid outer head, a cylindrical support therefor, said support being formed with a spiral groove, a lug or pin on the sleeve entering said groove, a brake-operating rod for forcing the sleeve over its support, a hollow cap on the solid end of the rotatable sleeve, the brake-operating rod extending through the cap and bearing against the solid head of the rotatable sleeve, means for rotatably connecting said rod to the cap, and a brake push-rod passing loosely through the support and bearing against the inner side of the solid head of the sleeve.

10. In a fluid-pressure brake, the combination, of a brake-cylinder, a brake-operating piston therein, a brake mechanism connected to said piston, an air-reservoir, a fluid-pressure mechanism connecting said air-reservoir to the brake-cylinder and normally maintaining a fluid under pressure on both sides of the brake-piston and holding the brakes in their released position, positively-driven means connected to the air-reservoir, which means by its action draws air from the fluid-pressure mechanism into said air-reservoir to apply the brakes and forces it from said reservoir to release the brakes, and valves in the fluid-pressure mechanism to permit air to flow from only one end of the brake-cylinder into the air-reservoir.

In testimony whereof I hereunto affix my signature, in the presence of two witnesses, this 2d day of September, 1899.

W. G. MacLAUGHLIN.

Witnesses:
 JNO. W. DAVIS,
 J. E. MASON.